United States Patent
Bock et al.

(10) Patent No.: US 7,218,726 B2
(45) Date of Patent: May 15, 2007

(54) COORDINATED NETWORK-WIDE ADMINISTRATION OF EXCHANGES

(75) Inventors: Christoph Bock, München (DE); Joachim Huttel, München (DE); Michael Moeller, Gröbenzell (DE); Irena Romanski, Egling (DE); Jochen Walz, Fürstenfeldbruck (DE)

(73) Assignee: Siemens Aktiengesellschaft, München (DE)

( * ) Notice: Subject to any disclaimer, the term of this patent is extended or adjusted under 35 U.S.C. 154(b) by 480 days.

(21) Appl. No.: 10/221,490

(22) PCT Filed: May 2, 2001

(86) PCT No.: PCT/DE01/01656

§ 371 (c)(1),
(2), (4) Date: Dec. 30, 2002

(87) PCT Pub. No.: WO01/84854

PCT Pub. Date: Nov. 8, 2001

(65) Prior Publication Data

US 2004/0013260 A1    Jan. 22, 2004

(30) Foreign Application Priority Data

May 4, 2000  (DE)  .................. 100 21 738

(51) Int. Cl.
*H04M 3/00*   (2006.01)
*H04M 3/42*   (2006.01)

(52) U.S. Cl. .................. 379/242; 379/201.01
(58) Field of Classification Search ................ 379/242, 379/201.01, 221.01
See application file for complete search history.

(56) References Cited

U.S. PATENT DOCUMENTS

| 5,533,116 A | 7/1996 | Vesterinen |
| 5,937,048 A * | 8/1999 | Pelle ...................... 379/201.12 |
| 6,377,988 B1 * | 4/2002 | Spector et al. .............. 709/224 |

FOREIGN PATENT DOCUMENTS

EP    0 854 607 A1    7/1998

OTHER PUBLICATIONS

XP-000557377; "Q3 Object Models for the Management of Exchanges" by Willi J. Petermueller; *IEEE Communications Magazine*, p. 48-60, c. 1996.

* cited by examiner

*Primary Examiner*—William J. Deane, Jr.
(74) *Attorney, Agent, or Firm*—Morrison & Foerster LLP

(57) ABSTRACT

This invention relates to an administration device (1) for administering and modifying operating functions of exchanges (6a . . . 6n) in a telephone network. The operating functions are administered and modified by means of administration commands. Said device comprises co-ordination means (2) for co-ordinating operating functions concerning several exchanges (6a . . . 6n). The invention also relates to a method for administering and modifying operating functions of exchanges (6a . . . 6n), used in this administration device (1).

10 Claims, 3 Drawing Sheets

COORDINATED NETWORK-WIDE ADMINISTRATION OF EXCHANGES

CLAIM FOR PRIORITY

This application claims priority to International Application No. PCT/DE01/01656 which was published in the German language on Nov. 11, 2001.

TECHNICAL FIELD OF THE INVENTION

The present invention relates to an administration device for administering and changing operating functions in a telephone network and to a method used in this administration device.

BACKGROUND OF THE INVENTION

Switching centers serve to connect subscribers, i.e., their terminals, with a telephone network. A plurality of switching centers is present in a telephone network. The switching centers are linked with one another.

The administration of operating functions in the control software of the switching centers takes place by administration commands (e.g., by way of proprietary Man-Machine Language commands, MML, or standardized Q3 commands), which are input at a console and are sent to the switching center from there. Such administrative tasks can be, for example, logical setup, modification, or deletion of a subscriber's terminal.

In the case of some operating functions, other switching centers also have to be coordinated if a change occurs in one switching center, i.e., the different administration commands to the affected switching centers must be precisely coordinated with one another. An example of this is the adaptation of routing tables in several switching centers to a change in one switching center. If the administration commands or their parameters deviate from this logical coordination in this connection, as the result of incorrect input, for example, then network-wide functionality of the corresponding operating function is no longer possible in the telephone network.

In the state of the art, coordination of network-wide administration is carried out manually. In this connection, if there is a change in an operating function, all of the necessary administration commands are manually compiled by one operator (i.e., by one authorized person). Local operators then send the different administration commands, which have been coordinated with one another, to the appropriate switching center by way of a console (referred to as an administration device hereinafter).

The disadvantage of this solution is that it requires significant administration effort because of the manual compilation of many administration commands for an administrative task or operating function.

In addition, when there is a large number of administration commands, errors can very easily occur during compilation or entry of the commands. Then, the feedback from all the administration commands must be collected and manually assessed for an analysis of the errors and the possible effects on coordinated administration.

SUMMARY OF THE INVENTION

It is therefore an aspect of the present invention to make available an administration device for administering and changing operating functions of switching centers. Accordingly, an administration device administers and changes operating functions of switching centers in a telephone network. The operating functions of the switching centers are administered and changed by administration commands that are received from the administration device. An input device inputs data with regard to an operating function to be changed. Coordination means for coordinating operating functions that relate to several switching centers is provided. The coordination means automatically calculates the appropriate administration commands for all the affected switching centers after data concerning an operating function to be changed has been input, and sends the commands to the affected switching centers.

According to another aspect of the invention, a method used in this administration device for administering and changing operating functions of switching centers is provided. A method for administering and changing operating functions of switching centers in a telephone network is provided. The operating functions of the switching centers are administered and changed by administration commands. The operating functions that relate to several switching centers are automatically calculated after data concerning an operating function to be changed has been input for all the affected switching centers. The operating functions are automatically sent to the affected switching centers. Thereby, a reduction in the error rate during the administration and modification of operating functions in switching centers is made possible.

According an aspect of the invention, the administration commands required for an administrative task or operating function are centrally calculated, i.e., generated by the administration device according to the invention, and sent to all the affected switching centers.

This automatic coordination and direct link with the switching centers results in a tremendous savings of time. This makes it possible to significantly increase productivity in performing administrative tasks (by a factor>100), which allows the operator of a telephone network and the switching centers to broadly market services and features that require complex administration.

Furthermore, the automatic generation of the administration commands reduces and even precludes errors in manual coordination or administration. The administration can therefore be performed in a centralized facility, by specially trained technical personnel, thereby eliminating expensive training of a large number of local operators.

In order to be able to correctly calculate and generate the operating functions and the resulting administration commands, it is necessary for the relevant information (data) in this regard to be stored centrally in a memory device. The administration device according to an aspect of the invention assesses the respective data from the memory device in order to implement the corresponding operating functions.

The invention can be used in a particularly advantageous manner in the so-called CENTREX service (Centralized Office Exchange Service), in order to administer groups and objects contained in these groups. This use will be explained in greater detail below on the basis of a preferred exemplary embodiment.

Changing operating functions that relate to routing of connections, in particular, has effects on several switching centers. Therefore it is advantageous to use the present invention for administering and changing routing tables in switching centers.

A standardized graphical user interface is available to the user or operator for inputting operating functions to be administered; this facilitates familiarization with applications that are used for network-wide administration.

Since the administrative tasks are centralized, centralized processing of feedback from the switching centers affected by an administrative task is also made possible. This significantly facilitates record-keeping and error analysis.

In the following, the present invention will be explained in greater detail on the basis of preferred exemplary embodiments, making reference to the attached drawings.

DETAILED DESCRIPTION OF THE INVENTION

Figure 1:
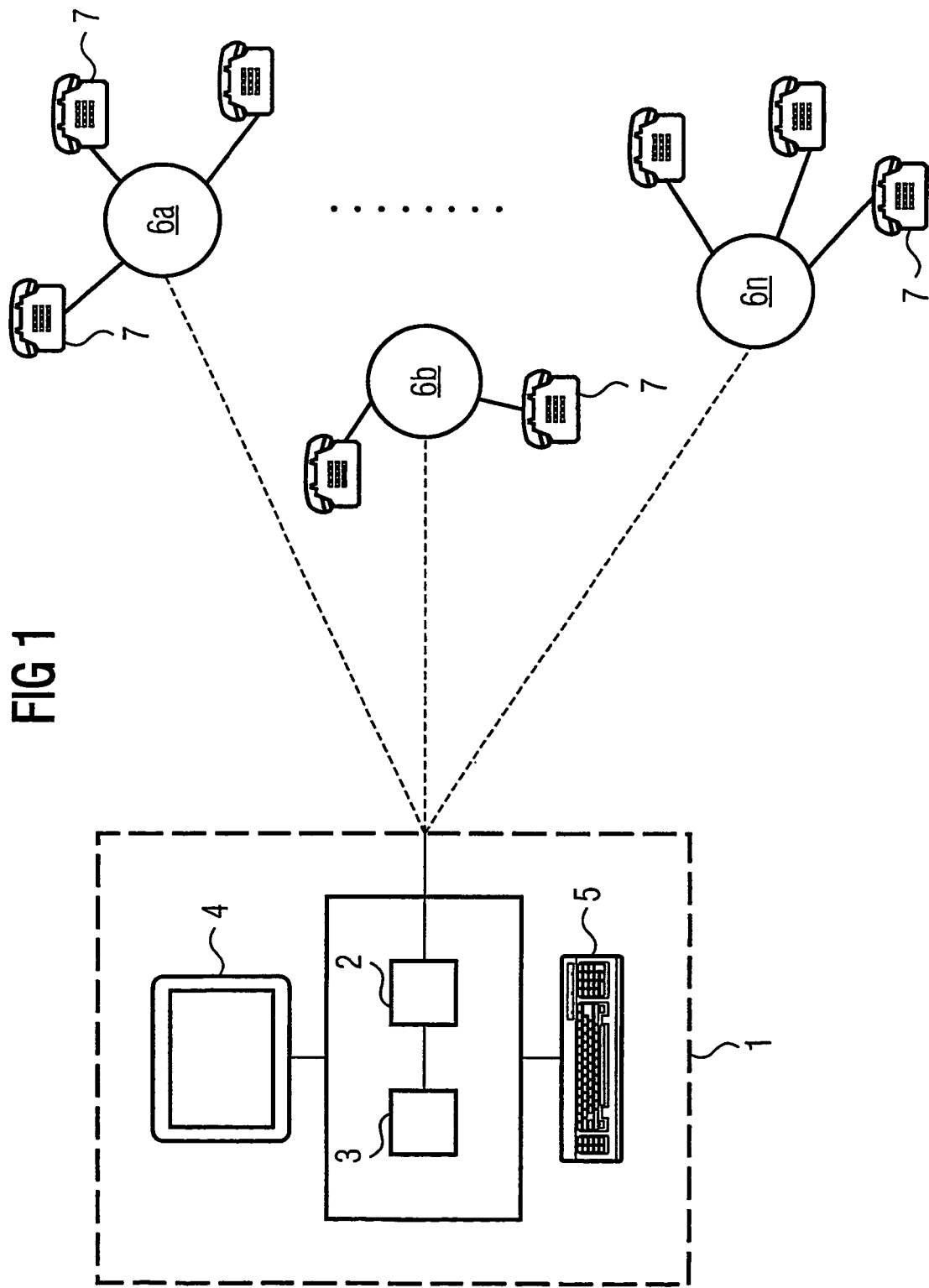
FIG. 1 is a schematic representation of the administration device, according to the invention, in a telephone network.

As is evident from FIG. 1, the administration device 1 according to the invention includes a terminal or a console with an input device (keyboard, mouse, etc.), a screen 4, coordination means 2 for coordinating operating functions, and a memory device 3 for storing the data required for administering and calculating the administration commands. A spatial separation of the administration device 1 and the administration of data in the memory device 3 would also be possible.

Coordination of the administration and modification of operating functions that have an effect on several switching centers therefore takes place in a centralized manner. The coordination means 2 for coordinating operating functions are implemented in the administration device 1 as software in the administration device 1. The administration device could be one or more computers (PCs) on which a program runs that fulfills the tasks of the coordination means 2, for example. A graphical user interface serves for inputting the data, i.e., the operating function to be changed, which is necessary in order to be able to carry out a specific administrative task. The administration commands are automatically generated from a minimum set of user entries, and are automatically sent to the affected switching centers. In this way, several thousand administration commands (e.g., MML commands) can be calculated and generated in the background from a single screen entry.

The logic for the task, in each instance, for network-wide administration, is anchored in the applications software. The operator is therefore relieved of manual coordination.

Because of the tremendous simplification of the user interface for administration, good record-keeping of the operating functions of sent administration commands that have been carried out is required. For this reason, the confirmations (feedback) from the switching centers in response to the administration commands are collected and stored in a database.

In this connection, the confirmations can be represented in three different granularity levels, for example. In one level, an overview of different administration tasks that have been carried out is given. In a more detailed level, the switching centers that were addressed for a specific administration task are shown. In the most detailed level, the individual commands to a switching center and the respective feedback are shown. At every level, the display shows whether the task was successfully or unsuccessfully completed (e.g., in total, at one switching center, or individual commands).

In the following, the present invention will be described for the administration of groups in the CENTREX service.

CENTREX is a special service in a network node, i.e., in a switching center, which makes the functionality of the switching center similar to a private branch exchange available to part of the connected objects (e.g., terminals, private branch exchanges). In this connection, these objects are organized in groups, with a group corresponding in its functionality to a private branch exchange. This service is useful for companies, for example, since no separate private branch exchange has to be acquired when using this service. Furthermore, with this service, it is possible to set up groups distributed in several switching centers, by way of the telephone network, whose objects can be reached, among one another, by way of a private telephone number plan. In this connection, the individual groups and their objects also have the function of a private branch exchange; the objects can be reached, among one another, by way of a private number plan. Depending on the network size, CENTREX groups that are distributed over a thousand switching centers are possible.

In order to create a telephone number plan, the administration commands to the affected switching centers have to be coordinated, since a change in one switching center (e.g., setting up a new group) can affect other switching centers. In this case, an administration task can comprise several hundred to several thousand administration commands to over one thousand switching centers.

Figure 2:
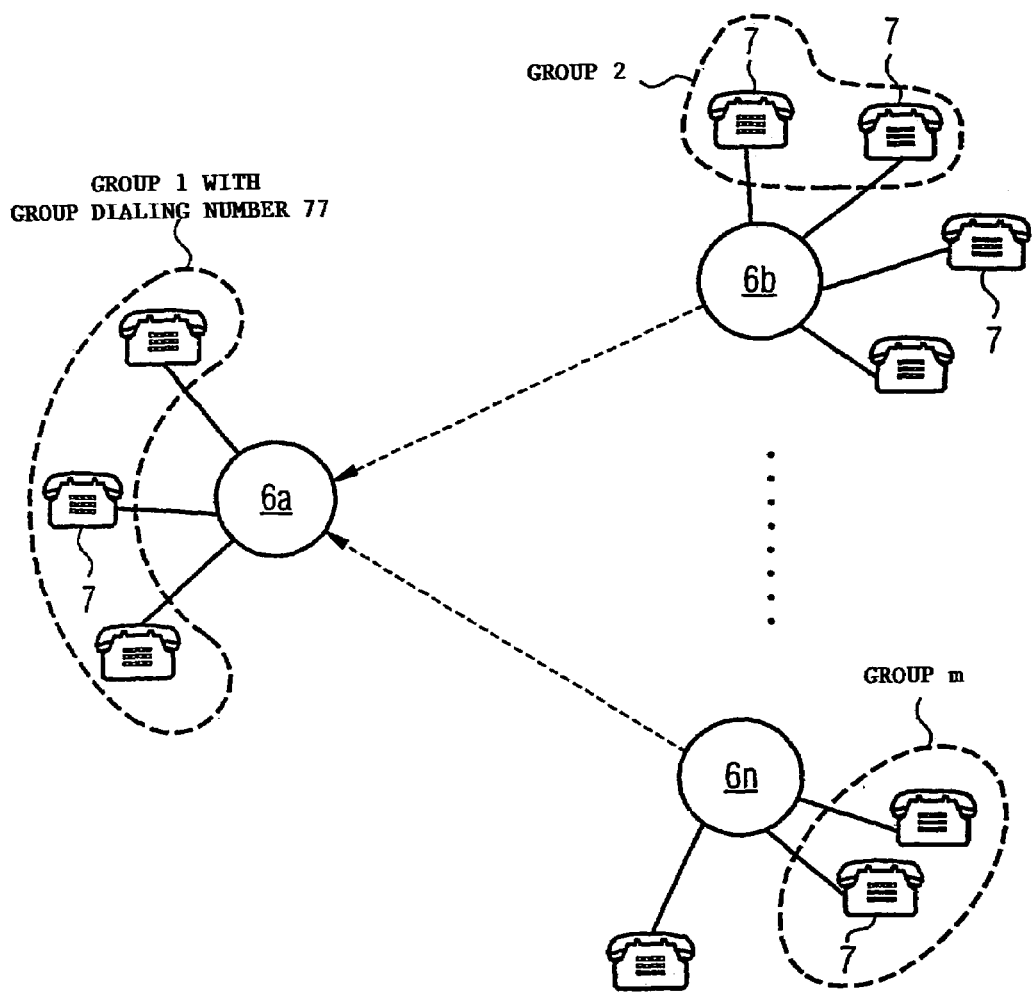
FIG. 2 is an example of the coordination of administrative tasks according to an aspect of the invention.

FIG. 2 shows the possibility of group cross-dialing (Group Dialing). Here, objects (e.g., terminals 7) of group 1, for example, are reached from all other groups by the group dialing number (e.g., 77) plus the internal telephone number (e.g., 888). This group dialing number must therefore be set up in every switching center where a cohesive group is set up, in order to be able to reach the group 1 or a subscriber connected with it from every related CENTREX group (e.g., branch offices of a company). For this purpose, every group has its own specific code (corresponding to the group dialing number), which must be set up in all the other groups and switching centers. In the case of 1000 groups, this means a total of 1 million MML commands: a command in a switching center of a Pro-CENTREX group to establish the group dialing number, and one command for each of the other 999 CENTREX groups, in order to enter the dialing number there.

Figure 3:
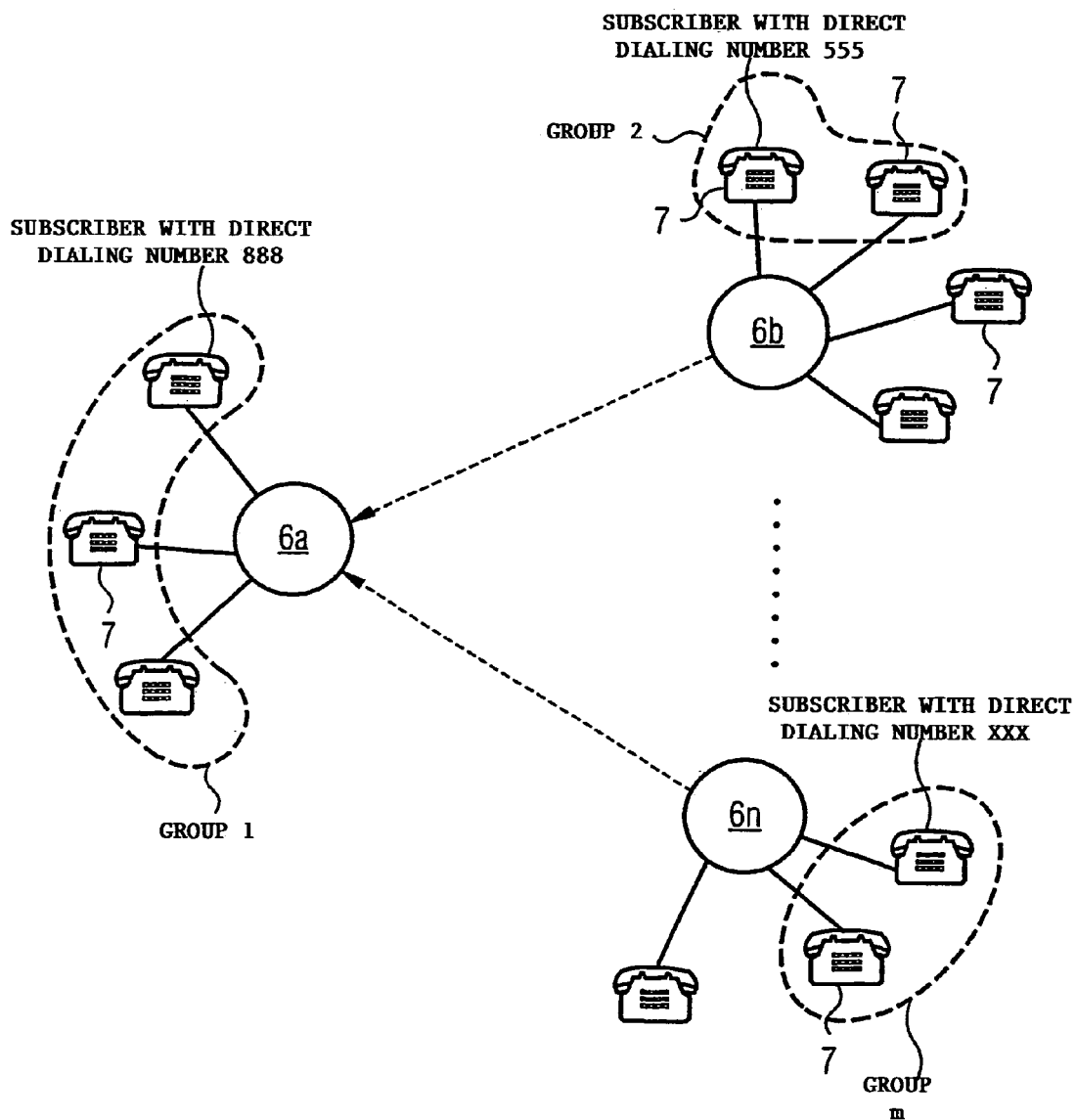
FIG. 3 is an example of the coordination of administrative tasks according to another aspect of the invention.

Another possibility of how a CENTREX subscriber (e.g., at switching center 6a) can reach another CENTREX subscriber at another switching center (e.g., 6b) involves setting up a uniform, network-wide telephone number plan as shown in FIG. 3. Here, every subscriber can be reached by way of his/her terminal 7, by way of a telephone number and a group dialing number. For this purpose, the internal telephone number of the subscriber (e.g., 888) must be clear network-wide, within all the cohesive groups. In this connection, the telephone number is set up at all the switching centers over which the cohesive CENTREX groups are distributed; only in this way can it be assured that the subscriber can be reached by way of the telephone network. In the case of 1000 groups with 10 subscribers each, this means a volume of 10 million MML commands.

According to the present invention, the coordination means 2 for coordinating operating functions are made available for setting up the telephone number plans as described, as are coordination functions to handle the tasks described, for other areas of the administration of CENTREX groups.

For example, for setting up a network-wide internal telephone number plan, the group dialing number at which the individual groups are supposed to be able to be reached according to FIG. 1, and the internal telephone number of the subscriber according to FIG. 2, are supposed to be set up in all the affected switching centers. Calculating, generating, and sending the administration commands necessary for this to the groups in question in the affected switching centers, in order to ensure that the respective group or a subscriber can be reached, takes place automatically, according to the invention.

Furthermore, there is the possibility of placing complicated administration tasks into a queue and determining a point in time at which the commands are automatically started, e.g., at a time with a low load in the switching centers.

What is claimed is:

1. An administration device for administering and changing operating functions of switching centers in a telephone network, the operating functions of the switching centers being administered and changed by administration commands that are received from the administration device, comprising:
   an input device for inputting data relating to an operating function to be changed; and
   coordination unit for coordinating operating functions that relate to several switching centers, the coordination unit automatically calculating the administration commands for all affected switching centers after data concerning an operating function to be changed have been input, and sending the administration commands to the affected switching centers, wherein data required for administering and calculating the administration commands is centrally stored in a memory device.

2. The administration device as recited in claim 1, wherein administering and changing the operating functions of the switching centers is done in a CENTREX service.

3. The administration device as recited in claim 1, wherein the administration device is used for administering and changing routing tables.

4. The administration device as recited in claim 1, wherein a graphical user interface is available for inputting the operating functions to be changed.

5. The administration device as recited in claim 1, wherein the administration device receives and processes feedback from corresponding switching centers concerning implementation of the received administration.

6. A method for administering and changing operating functions of switching centers in a telephone network, comprising:
   administering and changing the operating functions of the switching centers by administration commands; and
   automatically calculating operating functions that relate to several switching after data concerning an operating function to be changed has been input, for all affected switching centers, and automatically sent to the affected switching centers, wherein data required for administering and calculating the administration commands is stored centrally.

7. The method as recited in claim 6, the operating functions of groups and objects contained in the groups administered and changed in a CENTREX service.

8. The method as recited in claim 6, wherein routing tables are administered and changed.

9. The method as recited in claim 6, wherein a graphical user interface is used for inputting the operating functions to be changed.

10. The method as recited in claim 6, wherein feedback from the corresponding switching centers about implementation of the administration commands sent is received and processed centrally.

* * * * *